No. 629,319. Patented July 18, 1899.
J. A. MAIGNEN.
FILTERING ORGAN.
(Application filed Apr. 14, 1898.)
(No Model.) 3 Sheets—Sheet 1.
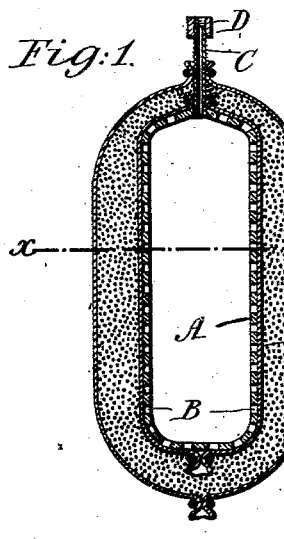
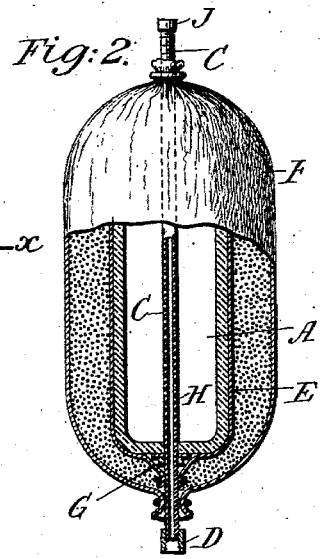
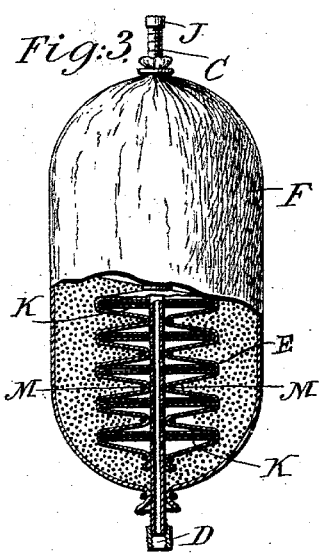
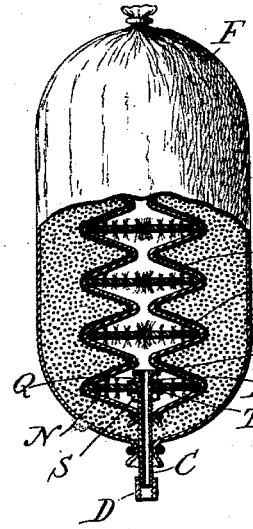
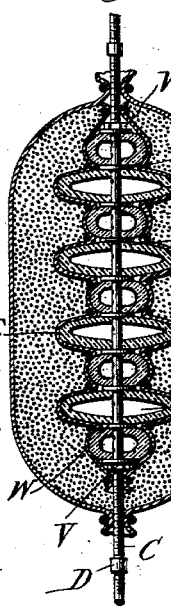
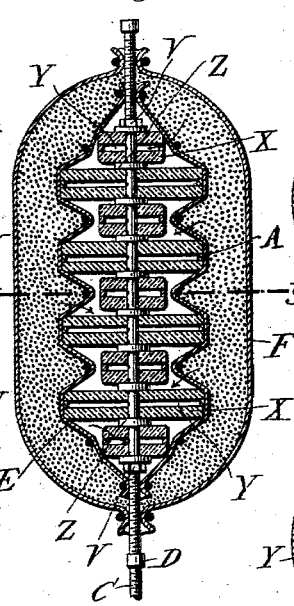
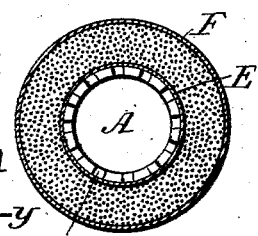
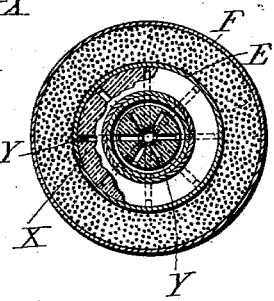
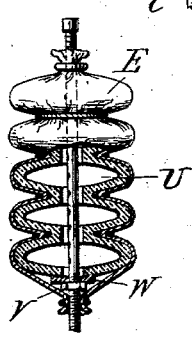
WITNESSES:
John A. Rennie
O. F. Eagle
INVENTOR
Jean Auguste Maignen
BY Wiedersheim & Fairbanks
ATTORNEYS.

No. 629,319. Patented July 18, 1899.
J. A. MAIGNEN.
FILTERING ORGAN.
(Application filed Apr. 14, 1898.)
(No Model.) 3 Sheets—Sheet 2.
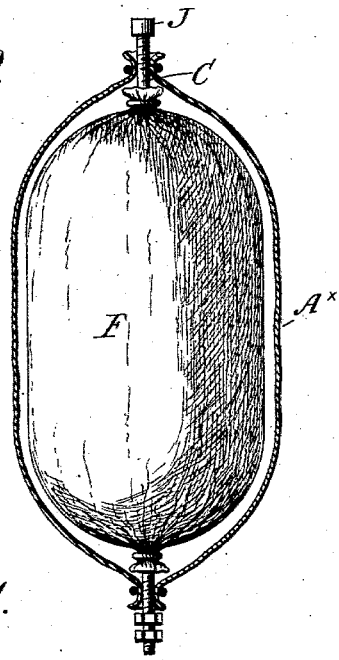
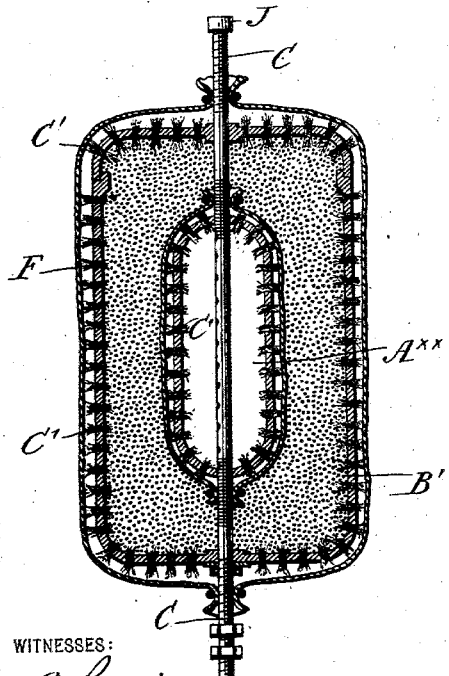
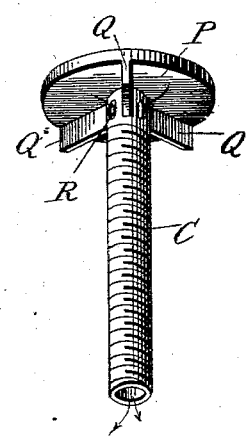
WITNESSES: INVENTOR
John A. Rennie Jean Auguste Maignen
C. F. Aragles BY
Wiedersheim & Fairbanks,
ATTORNEYS.

No. 629,319. Patented July 18, 1899.
J. A. MAIGNEN.
FILTERING ORGAN.
(Application filed Apr. 14, 1898.)
(No Model.) 3 Sheets—Sheet 3.
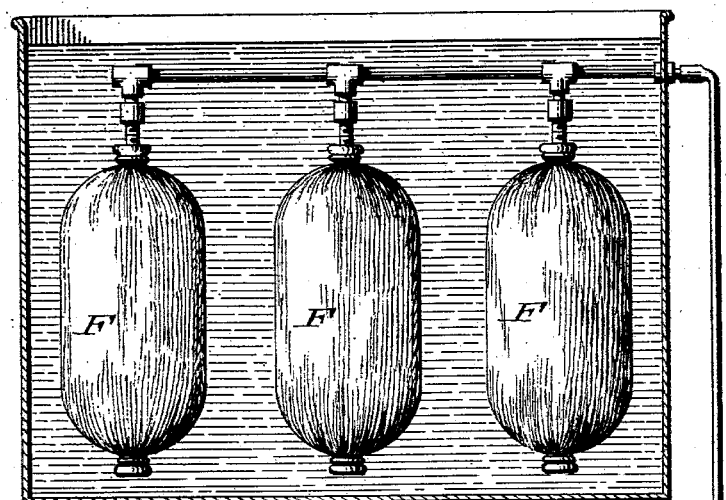
Fig. 15.
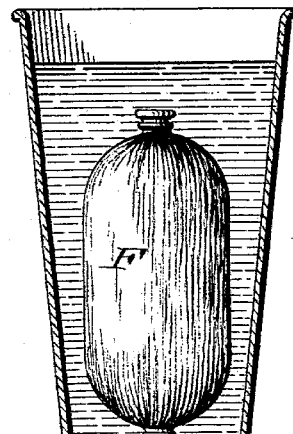
Fig. 14.
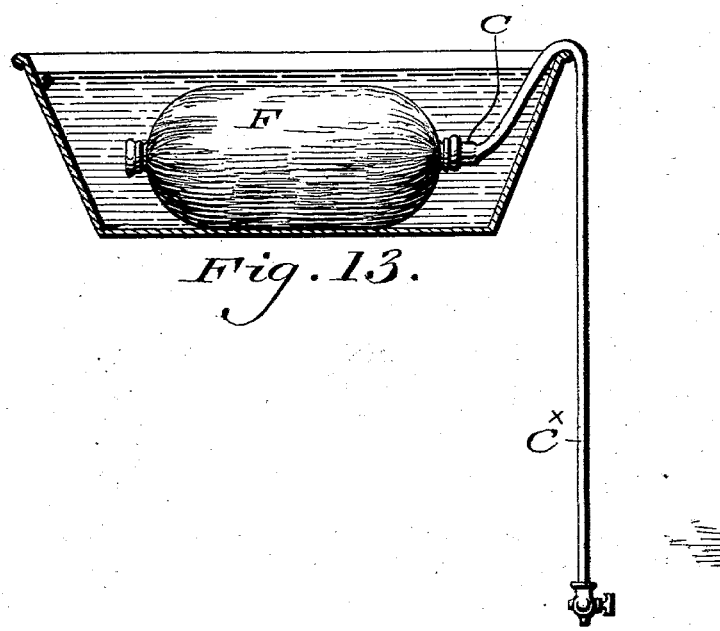
Fig. 13.
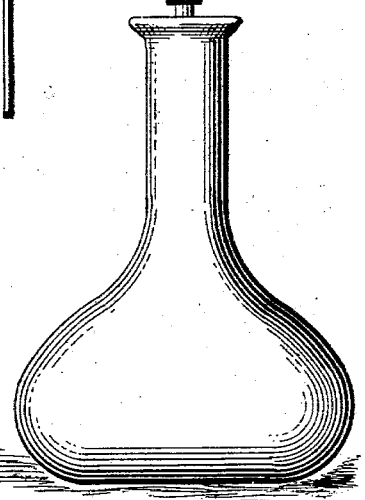

UNITED STATES PATENT OFFICE.

JEAN AUGUSTE MAIGNEN, OF PHILADELPHIA, PENNSYLVANIA.

FILTERING ORGAN.

SPECIFICATION forming part of Letters Patent No. 629,319, dated July 18, 1899.

Application filed April 14, 1898. Serial No. 677,596. (No model.)

*To all whom it may concern:*

Be it known that I, JEAN AUGUSTE MAIGNEN, a citizen of France, residing in the city and county of Philadelphia, State of Pennsylvania, have invented a new and useful Improvement in Filtering Organs, which improvement is fully set forth in the following specification and accompanying drawings.

My invention relates to certain improvements in filtering organs or devices intended for use in connection with various kinds of vessels, the object being to produce in a compact, simple, and inexpensive manner a filtering organ or device wherein the parts are so arranged that the water or other liquid to be purified will pass through said parts from the exterior thereof into the interior, whence it flows through any convenient conduit to the desired point of discharge in a thoroughly-purified condition.

The invention consists of a filtering organ having an inner and an outer sack, preferably made of asbestos cloth, the inner sack being mounted or stretched upon an internal core or support of a permeable character, so that the water may pass therethrough, or it may be made of material impervious to water and suitably perforated and providing between said sacks suitable filtering media, such as pulverized or powdered charcoal or other granular, fibrous, or porous material of an absorbent or non-absorbent nature.

The invention further consists in combining suitable and convenient means whereby the filtering organ or device may be thoroughly and effectively sterilized and cleaned after it has become clogged or otherwise impaired by the sediment or other impurities contained in the liquid.

The invention further consists of novel details of construction, all as will be hereinafter fully set forth, and particularly pointed out in the claims.

Figure 1 represents a central vertical section of a filtering organ embodying my invention in one of its forms. Fig. 2 represents a sectional elevation of the same, showing the core or support formed of one piece of permeable material. Figs. 3, 4, 5, and 6 represent similar views showing the central core or support made up in sections. Figs. 7 and 8 represent transverse sections taken on the lines $x$ $x$ and $y$ $y$ of Figs. 1 and 6, respectively. Fig. 9 represents a side elevation, partly in section, of the core or support made in irregular or corrugated form, but in one piece. Fig. 10 represents an elevation of the filter, showing an outer covering or sack applied thereto, the latter being shown in section. Fig. 11 represents a vertical section of a modified form of my improved filter. Fig. 12 represents, on an enlarged scale, a detail perspective view of the outlet-pipe which communicates with and leads from the core or support hereinafter referred to. Figs. 13 to 15 represent different means of applying or utilizing my filter elements or organs.

Similar letters of reference indicate corresponding parts in the figures.

Referring to the drawings, A designates an internal core or support, (shown in Figs. 1 and 2 as a cylindrical or other shaped body,) which may or may not be provided with perforations B, the said core or support forming a chamber A', having an outlet-pipe C communicating with the interior thereof and connecting with a conduit by the coupling-sleeve or other device D. As shown in Fig. 2, the core or support is made of permeable material, in which event it will be understood that the inherent quality of the material of which it is composed shall be sufficiently porous to allow the liquid to pass therethrough, porous porcelain or other porous ceramic, porous plastic charcoal, pumice or other porous stone, or other analogous material being applicable.

E designates an asbestos covering or sack which is stretched over the core or support A and secured thereto in any desired or convenient manner, between which and an outer sack F, also preferably made of asbestos, is inserted one or several filtering materials composed of pulverized or powdered charcoal or any granular, fibrous, or porous material of an absorbent or non-absorbent character.

The pipe C in Fig. 1 communicates with the interior of the core or support A, while in Fig. 2 it passes through the core or support, the terminals thereof projecting beyond the sacks E and F and being tapped or threaded to engage tightening-nuts G or similar devices, which latter serve to retain the core or support in place thereon, as will be evident. The pipe C in Fig. 2 is also perforated, as shown at H, through which the water or other liquid after filtering through the core or support may pass and from thence to any convenient point of delivery. These perforations also serve to admit air or other fluid or gas to allow of the easy circulation within the interior of the filter of the water or other liquid when it is directed into the pipe C for the purpose of sterilizing the filtering organ or device, although it is apparent in instances of serious clogging the filtering medium may be cleansed by removing the outer sack F, which may also be washed and replaced.

During the sterilizing operation the screw-cap J or equivalent will be removed from the pipe C in order that the sterilizing liquid introduced at the other end of said pipe may fill said core or support and distribute itself by osmose through the filtering media and sterilize them.

In Fig. 3 the core or support is made up of a plurality of disks K, preferably arranged in pairs separated from each other in any suitable manner, the whole being carried by the pipe C and covered with the asbestos cloth or sack E, which latter is drawn around the pipe C between each pair of disks K by the cords or rings M, thus materially increasing the area of filtration between the exterior and interior of the core or support A, as is evident.

In Fig. 4 the construction of the core or support A is analogous to that described with relation to Fig. 3; but instead of the disks being arranged in pairs I substitute therefor a series of single perforated disks N, through the perforations in which the water or other liquid after filtering through the cover or sack E will flow out through the pipe C to any convenient source of delivery. (Not shown.) The pipe C in this instance is threaded, as shown in detail in Fig. 12, and one end thereof is provided with a head P, upon the under side of which radial flanges or wings Q project, the latter being adapted to rest upon the inner face of the end disk N, so that open spaces may be left between it and the head P to allow the filtered water to pass through orifices R, arranged in the pipe C between each of said flanges, as well as through the upper open end of the pipe C.

A tightening-nut S and interposed washer T are arranged at the opposite or outer face of the disk N to bind the parts together, as will be understood.

Fig. 5 shows the core or support A made up of a plurality of differential cells or chambers U, preferably circular in form, each of which has an opening through which the pipe C passes, the latter being perforated and having its terminals threaded to receive tightening-nuts V, adapted to secure the cells firmly in place thereon. Washers W are interposed between each of the cells U to insure the water passing through them. Otherwise it would pass down the outside of the pipe to the outlet in a partially-unfiltered state. The asbestos covering or sack E is also stretched over these cells and held in place thereon by the cords or rings M, located at the lines of intersection between the said cells U.

In Fig. 6 a similar arrangement is shown; but instead of the cells U, I arrange upon the pipe C a plurality of differential disks or plates X, each of which is provided with a series of interior passages Y, the outer ends of said passages being closed, while the inner ends, which are open, lie close to the pipe C. Z designates washers, which are also interposed between each disk, so that the unfiltered water may not pass between them and out through the perforations in the pipe C, as before described. The covering or sack E is stretched over these disks, being securely fastened thereto in the same manner, and tightening-nuts V are employed, as previously described, to retain the disks in place upon the pipe C.

Fig. 9 shows substantially the same construction of core or support as shown in Fig. 5, the only difference being that the cells are of equal size throughout and are made of one piece of porous porcelain or other analogous material, in which formation a tightening-nut V and washer W are also employed at the ends, the use of which will be evident.

It may be found desirable in practice to provide the filter with an outer covering to prevent any sediment or secretions in the water from lodging upon or coming in contact with the asbestos sack F, and I have shown in Fig. 10 a covering $A^\times$ of this kind, preferably of asbestos cloth, which is fastened at both its ends to the pipe C, as shown, or to the ends of the said sack or covering F. This covering may be removed, washed, and replaced without disturbing the filtering organ or device, as will be obvious.

In Fig. 11 I have shown the filter as provided with a perforated core or support $A^{\times\times}$, normally resting within an outer casing or shell B', which is also provided with perforations wherein I arrange tufts C', of wicking, tow, or analogous material, to serve as an extra filtering media, and these tufts are also placed within the perforations of the core or support $A^{\times\times}$, and may be used, if found desirable, in connection with Figs. 1, 4, and 7. The asbestos covers or sacks E and F are used also to cover the said core or support $A^{\times\times}$ and the casing or shell B', as is also the pipe C, for conveying the filtered water therefrom, as previously described. It is also obvious that the covering or sack E may be coated upon the outside with a layer of fine material—such as pulverized charcoal, powdered or fibrous asbestos, powdered coke, or finely-ground minerals or equivalents—to increase the purifying qualities thereof and prevent the said cloth from contamination by the mud.

In Figs. 13, 14, and 15 I show the manner of utilizing my invention, Fig. 13 representing the filtering organ as lying on its side in any suitable vessel, the water being placed in the latter in an impure or unfiltered condition and flowing therefrom through the pipe C$^X$, after the manner of a siphon, into a drinking-cup or other receptacle. In Fig. 14 I show the filtering organ as supported in an upright position in a vessel, the water in a filtered condition flowing therefrom into a decanter or other vessel.

In Fig. 15 I show a plurality of filtering organs connected together in a substantially upright position, the pure or filtered water being discharged through the pipe C$^X$, as is evident.

It will be apparent that the foregoing are but a few of the modes of operation to which my invention is capable of being applied.

Having thus described my invention, what I claim as new, and desire to secure by Letters Patent, is—

1. A filter organ or device comprising an inner and an outer sack of asbestos or analogous material, the space between said sacks being adapted to receive filtering media, a permeable core or support arranged within said inner sack and means, communicating with the interior of said core or support, for withdrawing the filtered water.

2. A filter organ or device comprising an inner and an outer sack of asbestos or analogous material, a filtering media located between said sacks, a perforated permeable core or support contained within said inner sack, and a perforated pipe communicating with and leading from said core.

3. A filter organ or device comprising an inner and an outer sack, filtering media located between said sacks, a permeable core or support contained within said inner sack, and an outlet-pipe communicating with and leading from said core or support, whereby sterilizing fluid or gas may be introduced to sterilize the filter.

4. A filter organ or device comprising an inner and an outer sack, filtering media interposed between said sacks, a plurality of disks or cells located within said inner sack and adapted to form a core or support, a perforated pipe passing through one or more of said disks or cells, and a cap or closure arranged upon said pipe.

JEAN AUGUSTE MAIGNEN.

Witnesses:
JOHN A. WIEDERSHEIM,
WM. C. WIEDERSHEIM.